US008175257B1

(12) United States Patent
Shaffer et al.

(10) Patent No.: US 8,175,257 B1
(45) Date of Patent: May 8, 2012

(54) METHOD AND APPARATUS FOR SCHEDULING AUTOMATIC CALL DISTRIBUTION SYSTEM CALLERS

(75) Inventors: Shmuel Shaffer, Palo Alto, CA (US); Labhesh Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 846 days.

(21) Appl. No.: 09/872,688

(22) Filed: May 31, 2001

(51) Int. Cl.
*H04M 3/00* (2006.01)

(52) U.S. Cl. ......... 379/266.03; 379/265.02; 379/266.01; 379/266.06

(58) Field of Classification Search ............. 379/266.06, 379/93.25, 265.09, 265.02, 93.24, 210.01, 379/88, 266.1, 266.01, 265.01, 209.01, 266.03; 709/207; 370/356, 259
See application file for complete search history.

(56) References Cited

U.S. PATENT DOCUMENTS

| | | | |
|---|---|---|---|
| 4,788,715 A | 11/1988 | Lee | 379/84 |
| 5,181,236 A | 1/1993 | LaVallee et al. | 379/67 |
| 5,311,574 A | 5/1994 | Livanos | 379/88 |
| 5,329,583 A | 7/1994 | Jurgensen et al. | 379/266 |
| 5,506,898 A | 4/1996 | Costantini et al. | 379/266 |
| 5,511,112 A * | 4/1996 | Szlam | 379/266.06 |
| 5,526,416 A | 6/1996 | Dezonno et al. | 379/265 |
| 5,724,420 A | 3/1998 | Torgrim | 379/372 |
| 5,774,660 A | 6/1998 | Brendel et al. | 709/201 |
| 5,857,018 A | 1/1999 | Sumner et al. | 379/266 |
| 5,872,841 A * | 2/1999 | King et al. | 379/210.01 |
| 5,905,793 A | 5/1999 | Flockhart et al. | 379/266 |
| 5,915,001 A * | 6/1999 | Uppaluru | 379/88.22 |
| 5,946,388 A | 8/1999 | Walker et al. | 379/266 |
| 5,951,694 A | 9/1999 | Choquier et al. | 714/15 |
| 5,991,645 A | 11/1999 | Yuen et al. | 455/568 |
| 6,002,760 A | 12/1999 | Gisby | 379/266 |
| 6,006,264 A | 12/1999 | Colby et al. | 709/226 |
| 6,016,305 A | 1/2000 | Borst et al. | 370/234 |
| 6,046,762 A | 4/2000 | Sonesh et al. | 348/16 |
| 6,049,603 A | 4/2000 | Schwartz et al. | 379/309 |

(Continued)

FOREIGN PATENT DOCUMENTS
WO   WO 99/41895   8/1999

OTHER PUBLICATIONS

Information Sciences Institute, "Internet Protocol, Darpa Internet Program Protocol Specification," Univ. of Southern Calif., Marina del Rey, CA 90291 (45 pages), Sep. 1981.

(Continued)

*Primary Examiner* — Antim Shah
(74) *Attorney, Agent, or Firm* — Baker Botts L.L.P.

(57) ABSTRACT

A system and method are provided for reducing the wait time for a caller waiting to speak with an agent in an automatic call distribution system. The system and method receive a call from a caller, and receive an indication that the caller is to speak with one of a plurality of agents. The system and method inform the caller of a delay before the caller can speak to one of the plurality of agents and offers the caller an opportunity to establish a reservation to call back at a particular time. The system and method receive an indication that the caller would like to accept the reservation. The system and method provide the caller with a reservation code, and inform the caller to call back at the particular time.

34 Claims, 3 Drawing Sheets

U.S. PATENT DOCUMENTS

| | | | |
|---|---|---|---|
| 6,088,444 A | 7/2000 | Walker et al. | 379/266 |
| 6,128,642 A | 10/2000 | Doraswamy et al. | 709/201 |
| 6,128,657 A | 10/2000 | Okanoya et al. | 709/224 |
| 6,134,318 A * | 10/2000 | O'Neil | 379/266.01 |
| 6,137,777 A | 10/2000 | Vaid et al. | 370/230 |
| 6,141,328 A * | 10/2000 | Nabkel et al. | 370/259 |
| 6,148,410 A | 11/2000 | Baskey et al. | 714/4 |
| 6,185,619 B1 | 2/2001 | Joffe et al. | 709/229 |
| 6,201,962 B1 | 3/2001 | Sturniolo et al. | 455/432 |
| 6,249,801 B1 | 6/2001 | Zisapel et al. | 709/105 |
| 6,263,066 B1 | 7/2001 | Shtivelman et al. | 379/266 |
| 6,263,368 B1 | 7/2001 | Martin | 709/224 |
| 6,295,354 B1 | 9/2001 | Dezonno | 379/266 |
| 6,314,178 B1 | 11/2001 | Walker et al. | 379/266.01 |
| 6,327,622 B1 | 12/2001 | Jindal et al. | 709/228 |
| 6,330,602 B1 | 12/2001 | Law et al. | 709/224 |
| 6,385,309 B1 * | 5/2002 | Bennett et al. | 379/93.25 |
| 6,393,458 B1 | 5/2002 | Gigliotti et al. | 709/203 |
| 6,411,805 B1 * | 6/2002 | Becker et al. | 455/414.1 |
| 6,434,618 B1 | 8/2002 | Cohen et al. | 709/228 |
| 6,442,165 B1 | 8/2002 | Sitaraman et al. | 370/395.4 |
| 6,445,704 B1 | 9/2002 | Howes et al. | 370/392 |
| 6,456,619 B1 * | 9/2002 | Sassin et al. | 370/356 |
| 6,473,802 B2 | 10/2002 | Masters | 709/229 |
| 6,480,885 B1 * | 11/2002 | Olivier | 709/207 |
| 6,484,143 B1 | 11/2002 | Swildens et al. | 705/1 |
| 6,546,087 B2 | 4/2003 | Shaffer et al. | 379/90.01 |
| 6,546,097 B1 | 4/2003 | Peltz | 379/265.07 |
| 6,665,395 B1 * | 12/2003 | Busey et al. | 379/265.09 |
| 6,665,396 B1 | 12/2003 | Khouri et al. | 379/266.01 |
| 6,665,537 B1 | 12/2003 | Lioy | 455/435 |
| 6,711,256 B1 * | 3/2004 | O'Neil | 379/266.1 |
| 6,724,885 B1 * | 4/2004 | Deutsch et al. | 379/265.02 |
| 6,771,760 B1 * | 8/2004 | Vortman et al. | 379/209.01 |
| 6,788,769 B1 * | 9/2004 | Waites | 379/93.24 |
| 6,975,720 B1 * | 12/2005 | Crook | 379/266.01 |
| 7,085,366 B2 * | 8/2006 | O'Neil | 379/265.01 |
| 2004/0062379 A1 * | 4/2004 | O'Neil | 379/265.01 |

OTHER PUBLICATIONS

S. Deering, "Host Extensions for IP Multicasting," Stanford University (17 pages), Aug. 1989.

U.S. Appl. No. 10/606,438, entitled, *"System and Method for Tracking End Users In a Loadbalancing Environment"*, inventors Robert M Batz, et al, filed Jun. 25, 2003, 28 pages Specification, Claims and Abstract, 1 sheet of drawings.

U.S. Appl. No. 10/649,452, entitled, *"Method and System for Managing Calls of an Automatic Call Distributor"*, inventors Shmuel (nmi) Shaffer, et al., filed Aug. 25, 2003, 34 pages Specification, Claims and Abstract, 2 sheets of drawings.

U.S. Appl. No. 10/649,517, entitled, *"Method and System for Utilizing Proxy Designation in a Call System"*, inventors Shmuel (nmi) Shaffer, et al., filed Aug. 25, 2003, 43 pages Specification, Claims and Abstract, 2 sheets of drawings.

IBM Technical Disclosure Bulletin, "Computerized Call Return Feature"; vol. 28, No. 11;pp. 4897-4901; IBM Corp. (5 pgs), Apr. 1986.

PCT; International Search Report and Written Opinion; (IS/EPO) for PCT/US2006/033077 (13 pages), Feb. 14, 2007.

* cited by examiner

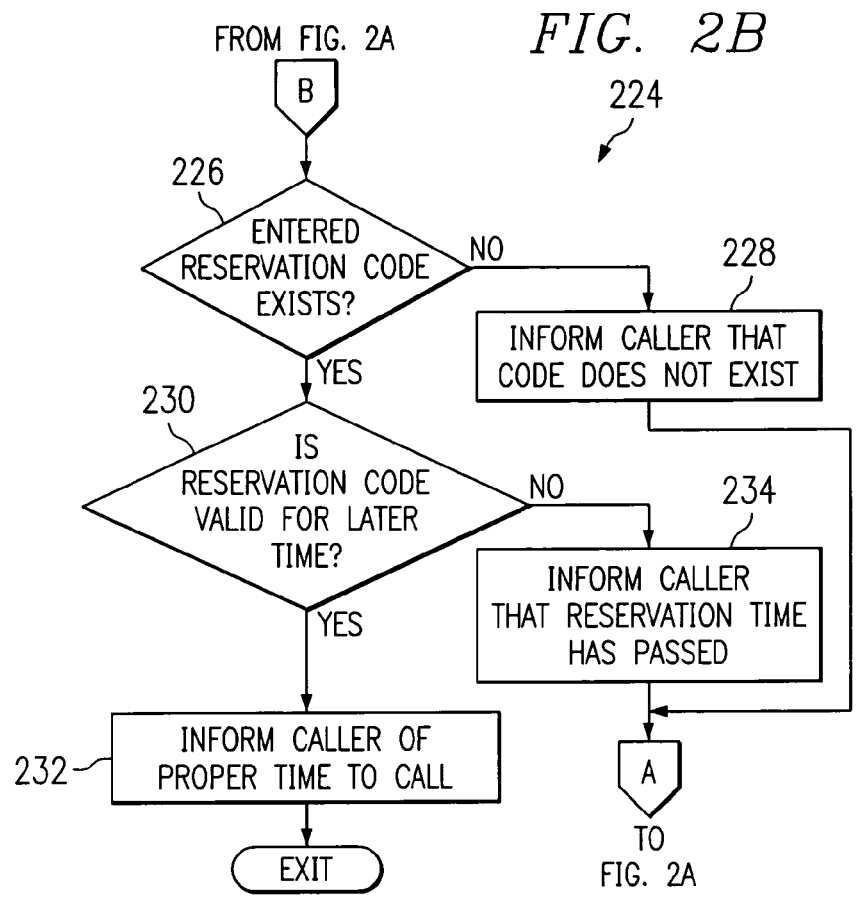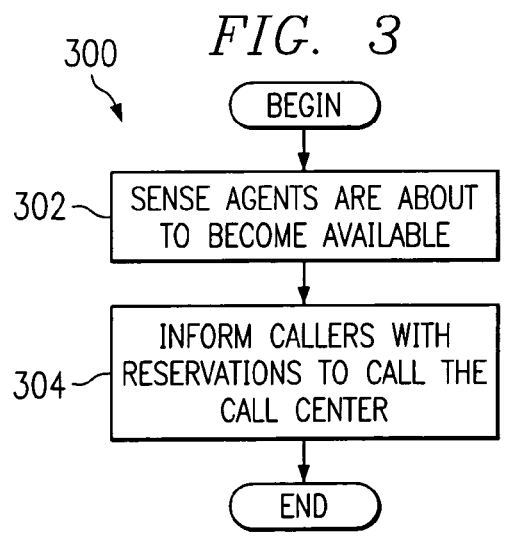

METHOD AND APPARATUS FOR SCHEDULING AUTOMATIC CALL DISTRIBUTION SYSTEM CALLERS

TECHNICAL FIELD OF THE INVENTION

This invention relates in general to automatic call distribution systems, and more particularly to providing alternatives to waiting in long queues for an agent.

BACKGROUND OF THE INVENTION

An automatic call distribution system (hereinafter 'ACD system') is a telephone facility that manages incoming calls and handles them based on the number called and an associated database of handling instructions. Many companies offering sales and service support use ACD systems to validate callers, make outgoing responses, gather usage statistics, forward calls to agents, and provide other services.

ACD systems are utilized in call centers to provide information automatically to callers based on programmed database handling instructions, and to forward callers to operators, referred to as "agents" in ACD terminology. When a caller calls into a call center, the ACD system within the call center can provide information to the caller. The ACD system can be configured to allow the caller to request an agent. Callers request an agent by depressing the keys on their telephone dial pad. After requesting an agent, the ACD system typically routes the caller through a queue before connecting the caller to an agent. The caller has the option to indicate the requested service or skill, e.g., home insurance vs. car insurance, and the ACD system will queue the caller for the right agent. Some ACD systems inform the caller how long the wait will be for an agent. This allows callers to chose whether they want to wait in the queue or whether they want to call back at a different time.

SUMMARY OF THE INVENTION

In accordance with the present invention, disadvantages and problems associated with waiting for an agent on an ACD system have been reduced or eliminated. In particular, a caller can request a reservation to call back at another time when the wait time for the caller may be reduced.

In accordance with one embodiment of the present invention, a method for reducing the wait time of a caller in an ACD system is provided. An aspect of the invention includes receiving a call from a caller, receiving an indication that the caller is to speak with one of a plurality of agents, and determining a particular time for the caller to speak with one of the plurality of agents.

Another aspect of this invention includes sensing that a queue of calls is below a threshold indicative of an availability of an agent, and transmitting a message to a caller that an agent is about to become available.

Yet another aspect of this invention includes receiving a call from a caller, and receiving an indication that the caller is to speak with one of a plurality of agents. The caller is informed of a delay before the caller can speak to one of the plurality of agents and offered an opportunity to establish a reservation to call back at a particular time. The caller indicates that the caller would like to make the reservation. The caller may be able to specify the preferred time for the reservation. The caller is provided with a reservation code, and informed to call back at the agreed upon time.

Important technical advantages of certain embodiments of the present invention include shorter wait times when waiting to speak with an agent after calling into an ACD system, reducing the cost a company must expend for supplying toll-free calls, reducing the time callers spend in queues, reducing the number of servers required to operate call centers, increasing the volume of calls at times that historically have low volumes of calls, and improved ability to predict the number of incoming calls at a given time and thus schedule agents to handle the incoming calls more appropriately.

Other technical advantages will be readily apparent to one skilled in the art from the following figures, descriptions and claims.

BRIEF DESCRIPTION OF THE DRAWINGS

For a more complete understanding of the present invention and its advantages, reference is now made to the following description, taken in conjunction with the accompanying drawings, in which:

FIG. 2B is a flow chart illustrating a part of the process shown in FIG. 2A;

FIG. 3 is a flow chart illustrating a process of the present invention for informing a caller to call a call center.

Figure 1:
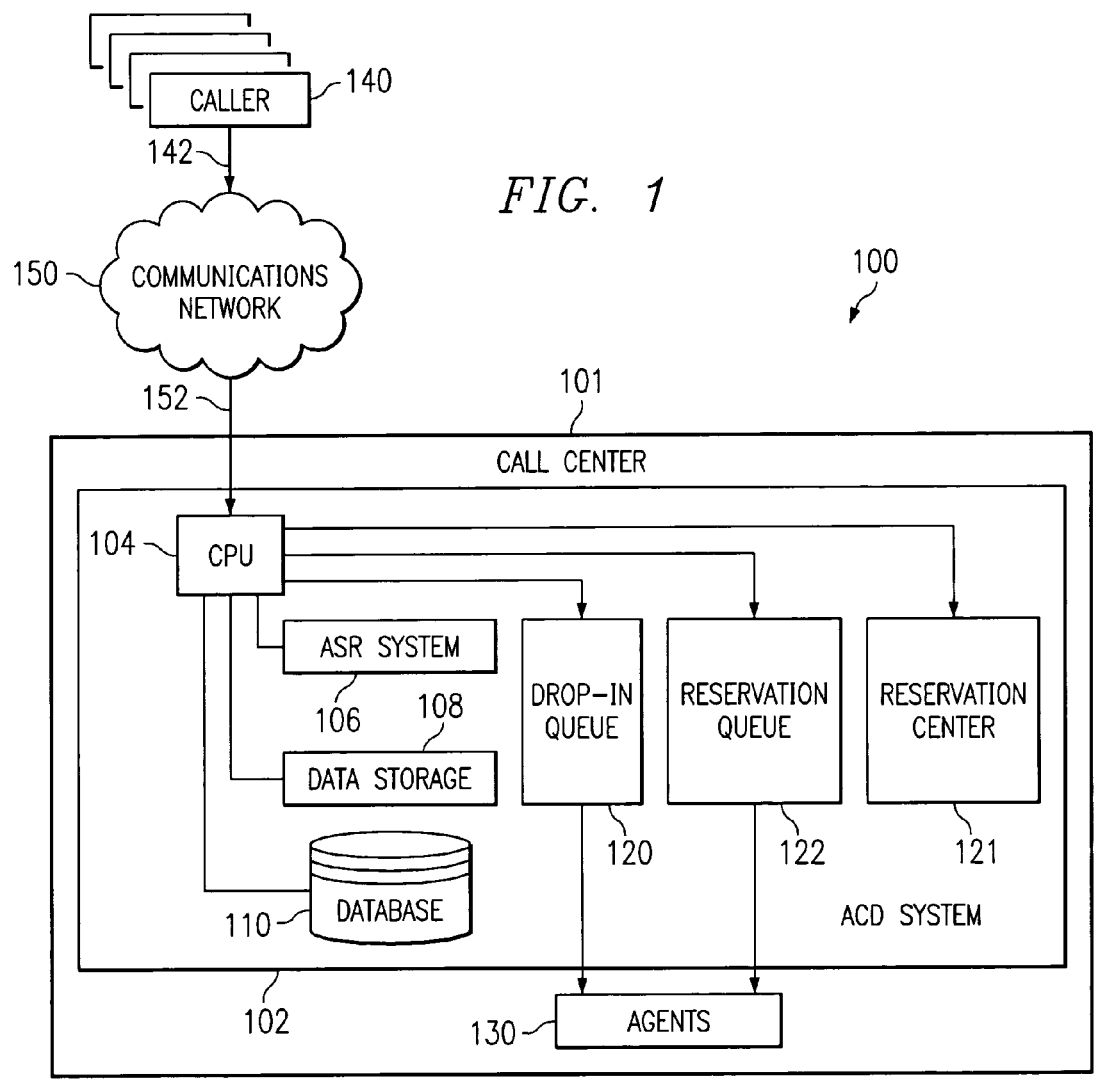
FIG. 1 is a block diagram illustrating a call center system of the present invention.

Throughout the figures, unless otherwise stated, the same reference numerals and characters are used to denote like features, elements, components, or portions of the illustrated embodiments. Moreover, while the subject invention will now be described in detail with reference to the figures, and in connection with the illustrative embodiments, changes and modifications can be made to the described embodiments without departing from the true scope and spirit of the subject invention as defined by the appended claims.

DETAILED DESCRIPTION OF THE INVENTION

FIG. 1 illustrates a call center system 100 of the present invention. The call center system 100 including a call center 101, a communications network 150, a communications link 152, a group of callers 140, and a group of phone lines 142 is provided. In a certain embodiment, the communications network 150 is the public telephone network. The call center 101 includes an ACD system 102 and a group of agents 130.

A caller from the group of callers 140 calls into the call center 101 through the communications network 150. The caller can use by way of example a conventional telephone, a soft phone, which runs on a personal computer, or an Internet protocol enabled phone. Once the call center 101 receives the call, the caller's call is routed to the ACD system 102. The ACD system 102 includes a central processing unit 104, an automatic speech recognition system 106, a data storage element 108, a database 110, and a drop-in queue 120. The ACD system 102 interacts with the caller, providing the caller with the information the ACD system 102 is programmed to provide. In some systems, if the ACD system 102 is not programmed to provide the caller with the information the caller needs, the caller can be routed to one of the agents from the group of agents 130.

If the caller indicates that the caller wants to speak with one of the agents from the group of agents 130, the caller is routed through the drop-in queue 120 to one of the agents from the group of agents 130. Routing the caller through the drop-in queue 120 allows for the eventuality that all call center agents are busy. If all agents are busy, the caller can wait in the drop-in queue 120 along with other callers until one of the agents from the group of agents 130 is available. Typically, the drop-in queue 120 is a first-in-first-out queue. If the caller wants to speak with one of the agents from the group of agents 130, the caller can wait in the drop-in queue 120.

The wait time while a caller is in the drop-in queue 120 can vary widely. Some call centers 101 provide the caller with a projected length of time before the caller will be able to speak with an agent. This is typically done by taking the total number of callers in the drop-in queue 120 and multiplying that number by the average time it takes an agent to answer a caller's questions.

If the caller does not want to wait in the drop-in queue 120 along with other callers until an agent is available, the caller is routed to a reservation center 121 for the caller to make a reservation. The caller is routed to a reservation queue 122 if the caller has a reservation and if the caller calls at the "reserved" time slot. In a certain embodiment, the drop-in queue 120 and the reservation queue 122 are first-in-first-out queues. In a certain embodiment, the order in the reservation queue is according to the time of the reservation provided the caller called in at the time the caller was assigned. In a certain embodiment, the reservation queue 122 has a higher priority than the drop-in queue 120, such that each of the callers waiting in the reservation queue 122 are routed to one of the agents from the group of agents 130 sooner than the caller would have been routed to one of the agents of the group of agents 130 from the drop-in queue 120. This may be controlled by directing all or a portion of all calls in the reservation queue 122 to one of the agents prior to routing the next call in the drop-in queue 120 scheduled to be routed to one of the agents.

In an alternate embodiment, callers from the drop-in queue 120 are routed to a first group of agents and callers from the reservation queue 122 are routed to a second group of agents. Wait time may be controlled by limiting the number of reservations allocated for a particular time frame and/or by assigning the right number of agents to handle the callers with reservations. In an alternative embodiment the callers with reservations call in using phone lines/numbers different from the callers without reservations.

Figure 2A:
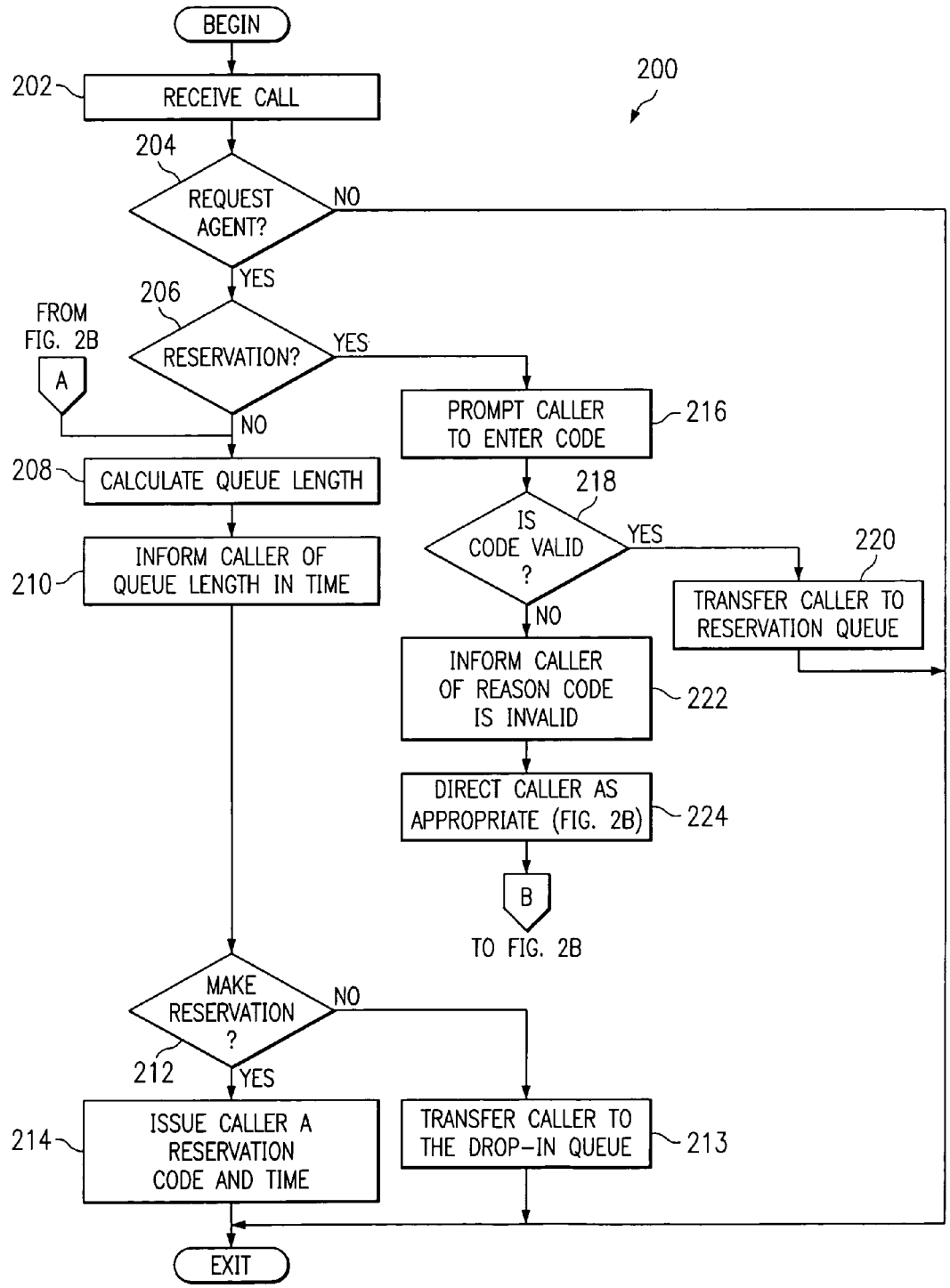
FIG. 2A is a flow chart illustrating a process of the present invention for responding to a caller requesting an agent.

FIGS. 2A and 2B illustrate a process 200 of the present invention for responding to a caller requesting an agent. The call center 101 receives a call from a caller of the group of callers 140 at step 202 and connects the caller with the ACD system 102. The caller is queried as to whether the caller would like to speak with an agent at step 204. If the caller does not want to speak with an agent, the process 200 exits. If the caller would like to speak with an agent, the process 200 advances to step 206.

At step 206, the caller is queried as to whether the caller has a reservation to speak with an agent. If the caller indicates that the caller does have a reservation to speak with an agent, the process 200 advance to step 216. If the caller does not have a reservation to speak with an agent, the process advances to step 208.

At step 208, the ACD system 102 calculates a wait time for the drop-in queue 120. The ACD system 102 calculates the wait time by determining the number of callers currently waiting in the drop-in queue, and multiplying that number by the average length of time the agents of the group of agents 130 spend speaking with a caller. At step 210, the ACD system 102 informs the caller of the wait time for the drop-in queue 120.

After informing the caller of the wait time, the ACD system 102 gives the caller the opportunity to make a reservation at step 212. If the caller would like to make a reservation, the process 200 advances to step 214 and the reservation is made at the reservation center 121. If the caller does not want to make a reservation, the process advances to step 213. At step 213, the ACD system 102 places the caller in the drop-in queue, then exits the process 200.

The ACD system 102 issues the caller a reservation at step 214. The ACD system 102 informs the caller of a reservation time for the caller, and issues the caller a reservation code. The reservation time is a time frame within which the reservation code will be recognized by the ACD system 102. The reservation code may be an alphanumeric code which can be inputted through the keypad of a traditional phone. After the reservation code and time are issued and stored in the ACD system 102, the process 200 exits.

In an alternate embodiment, the reservation code is suggested by the caller. In another alternate embodiment, the reservation code is a recording of the caller speaking his or her name or some other identification. When the caller calls back, the ACD system 102 uses the ASR system 106 to match the recording stored in the data storage element 108 with the name or other identification the caller spoke over the phone.

In an alternate embodiment, the reservation time is negotiated between the caller and the ACD system 102. The negotiation may include by way of example, the amount of time the caller is willing to wait and/or when the caller is available. At certain times, the caller may be willing to wait longer than at other times. The caller may use the phone keypad or employ the ASR system 106 to convey information to the ACD system 102 during the negotiation.

In another alternate embodiment, the ACD system 102 presents the caller with a number of alternative reservation time frames from which the caller can pick the most convenient. In an alternative embodiment, the caller indicates the time frame within which the caller wants to call back and the ACD system 102 informs the caller of the next available time and/or day.

At step 216, the caller is prompted to enter the previously issued reservation code. The caller enters the reservation code and indicates that he or she has finished entering the reservation code. The ACD system 102 verifies that the reservation code is valid at step 218. The ACD system 102 verifies that the code is valid by looking for the entered code within the database 110. If the entered code is stored as a valid code for the current time within the database 110, the process 200 advances to step 220 where the caller is transferred or directed to the reservation queue 122. If the entered code is not stored as a valid code for the current time or the code is not valid, the process 200 advances to step 222.

At step 222, the ACD system 102 informs the caller of the reason the reservation code is not valid. At step 224, the caller is directed as appropriate.

FIG. 2B shows in greater detail how the caller is directed at step 224. It is determined at step 226 whether the entered reservation code exists. If the ACD system 102 does not find the entered reservation code in the database 110 at step 228, the caller is informed that the entered reservation code does not exist and the process 200 advances to step 208 to determine whether the caller wants to make a new reservation. If the ACD system 102 finds the entered reservation code, at step 230 the ACD system 202 determines whether the reservation code is valid for a later time. If the reservation code is valid at a later time, at 232 the caller is informed of the proper time to call and the process 200 exits. Alternatively, the call may be placed in the reservation queue 122 which is sorted by the time of the reservation. If the ACD system 102 finds the entered reservation code was valid at an earlier time, at step 234 the caller is informed that the reservation time has passed, and the process 200 advances to step 208 to determine whether the caller would like to make another reservation for a later time.

Returning to FIG. 2A, if at step 218 the reservation code is found to be valid, the ACD system 102 transfers the caller to the reservation queue 122 at step 220. After the caller is transferred to the reservation queue 122, the process 200 exits.

FIG. 3 illustrates a process 300 for notifying a caller with a reservation that it is a good time to call the call center 102. At step 302, the ACD system 102 senses that the number of callers in the drop-in queue 120 has decreased to a currently set threshold. The currently set threshold may be fixed or may be set in accordance with any number of parameters including the time of day, day of the week, season, number of agents available, empirical or statistical data or any other parameter that may correspond to an acceptable waiting time. In other words, the ACD system 202 senses that agents are about to become available. Once the ACD system 102 senses this current set threshold, the process 300 advances to step 304.

At step 304, the ACD system 102 notifies a number of callers with reservations that it would be a good time to call the call center, because the group wait time is short. Callers can be notified any number of ways, including instant messaging, pager, cell phone, work phone, and home phone. Alternatively, the ACD system 102 can call the callers instead of informing them that it is a good time to call. After the callers are informed, the process 300 exits. In an alternative embodiment, the caller selects the threshold that corresponds to a certain wait time. In other words, if a caller is willing to wait 15 minutes, the caller will be connected at step 304 when that threshold is reached. Another caller may set the threshold for 5 minutes.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method for reducing the wait time of a caller in an automatic call distribution system, comprising:
   receiving a first voice call from a phone of a caller;
   receiving an indication from the phone of the caller that the caller desires to speak with one of a plurality of agents;
   placing the received first voice call in a drop-in queue, the first voice call's place in the drop-in queue changing over time;
   while the caller is waiting to speak with one of the plurality of agents when the first voice call is in the drop-in queue, providing the caller with an option, via the phone of the caller, to schedule a reservation to call back wherein the reservation is independent of the first voice call's place in the drop-in queue, wherein if the caller schedules the reservation, the first voice call's place in the drop-in queue is no longer maintained;
   upon receiving a second voice call from the caller based on the reservation, placing the second voice call in a reservation queue if the plurality of agents are busy, the second voice call placed in the reservation queue irrespective of the first voice call's place in the drop-in queue; and
   connecting the second voice call with an agent of the plurality of agents, the second voice call connected with the agent irrespective of the first voice call's place in the drop-in queue.

2. The method of claim 1 further comprising:
   informing the caller of a delay before the caller can speak to one of the plurality of agents;
   receiving an indication that the caller would like to schedule the reservation to call back; and
   informing the caller to call back during a reservation time frame.

3. The method of claim 2 further comprising providing a reservation code to the caller.

4. The method of claim 3, wherein the reservation code is an alphanumeric code.

5. The method of claim 2, further comprising recording the caller speaking.

6. The method of claim 2, further comprising depositing a cookie to a soft phone of the caller.

7. The method of claim 2, further comprising depositing a cookie to an interne protocol phone.

8. The method of claim 2, wherein the reservation time frame is dictated by an automatic call distribution system.

9. The method of claim 1, further comprising:
   receiving a call back from the caller;
   receiving a reservation code from the caller;
   validating the reservation code; and
   placing the call in a reservation queue if the reservation code is valid.

10. The method of claim 9, wherein the reservation queue is a first-in-first-out queue.

11. The method of claim 9, comprising sorting the call in the reservation queue among a plurality of calls in the reservation queue based at least in part on the reservation time frame.

12. The method of claim 9, wherein the reservation code is communicated vocally through an automated speech recognition system.

13. The method of claim 9, wherein the reservation code is an alphanumeric code.

14. The method of claim 9, wherein the reservation code is a spoken name of the caller.

15. The method of claim 9, further comprising placing the call in the drop-in queue if the reservation code is not valid, wherein the reservation queue is a higher priority than the drop-in queue.

16. The method of claim 1, further comprising:
   sensing that a queue of calls is below a threshold indicative of the availability of an agent, and
   transmitting a message to a caller that the agent is about to become available.

17. The method of claim 1, further comprising storing a reservation code to be used by the caller when the caller calls back.

18. The method of claim 17, further comprising storing a reservation time frame in which the reservation code will be accepted.

19. A method for reducing the wait time of a caller in an automatic call distribution system, comprising:
   receiving a voice call from a phone of a caller;
   receiving an indication from the phone of the caller that the caller desires to speak with one of a plurality of agents;
   while the caller is waiting to speak with one of the plurality of agents when the voice call is in the drop-in queue:
   providing the caller with an option, via the phone of the caller, to schedule a reservation to call back;
   informing the caller, via the phone of the caller, of a delay before the caller can speak to one of the plurality of agents;
   receiving an indication from the phone of the caller that the caller would like to schedule the reservation to call back;

informing the caller, via the phone of the caller, to call back during a reservation time frame;
wherein the reservation time frame is negotiated between the caller and an automatic call distribution system; and
wherein the negotiation between the caller and the automatic call distribution system comprises:
  providing to the caller, via the phone of the caller at one time as a group, a plurality of alternative reservation time frames each comprising a time frame in the future during which the caller may call back to speak with one of the plurality of agents; and
  in response to the plurality of alternative reservation time frames being provided at the one time, receiving from the phone of the caller while on the call a selection of a reservation time frame, the selected reservation time frame being one out of the plurality of alternative reservation time frames provided as a group at the one time.

20. An automatic call distribution system comprising:
means for receiving a first voice call from a phone of a caller;
means for receiving an indication from the phone of the caller that the caller desires to speak with one of a plurality of agents;
means for placing the received first voice call in a drop-in queue, the first voice call's place in the drop-in queue changing over time;
while the caller is waiting to speak with one of the plurality of agents when the first voice call is in the drop-in queue, means for providing the caller with an option, via the phone of the caller, to schedule a reservation to call back wherein the reservation is independent of the first voice call's place in the drop-in queue, wherein if the caller schedules the reservation, the first voice call's place in the drop-in queue is no longer maintained;
upon receiving a second voice call from the caller based on the reservation, means for placing the second voice call in a reservation queue if the plurality of agents are busy, the second voice call placed in the reservation queue irrespective of the first voice call's place in the drop-in queue; and
means for connecting the second voice call with an agent of the plurality of agents, the second voice call connected with the agent irrespective of the first voice call's place in the drop-in queue.

21. The system of claim 20 further comprising:
means for informing the caller of a delay before the caller can speak to one of the plurality of agents;
means for receiving an indication that the caller would like to schedule the reservation to call back; and
means for informing the caller to call back during a reservation time frame.

22. The system of claim 21, further comprising providing a reservation code to the caller.

23. The system of claim 21, wherein the reservation code is an alphanumeric code.

24. The system of claim 21, further comprising means for recording the caller speaking.

25. The system of claim 20 further comprising:
means for receiving a call back from the caller;
means for receiving a reservation code from the caller;
means for validating the reservation code; and
means for placing the caller in a reservation queue if the reservation code is valid.

26. The system of claim 20, further comprising:
means for sensing that a queue of calls is below a threshold indicative of the availability of an agent; and
means for transmitting a message to a caller that the agent is about to become available.

27. Logic encoded on non-transitory computer readable media comprising software that, when executed by a processor, is operable to:
receive a first voice call from a phone of a caller;
receive an indication from the phone of the caller that the caller desires to speak with one of a plurality of agents;
place the received first voice call in a drop-in queue, the first voice call's place in the drop-in queue changing over time,
while the caller is waiting to speak with one of the plurality of agents when the first voice call is in the drop-in queue, provide the caller with an option, via the phone of the caller, to schedule a reservation to call back wherein the reservation is independent of the first voice call's place in the drop-in queue, wherein if the caller schedules the reservation, the first voice call's place in the drop-in queue is no longer maintained;
upon receiving a second voice call from the caller based on the reservation, placing the second voice call in a reservation queue if the plurality of agents are busy, the second voice call placed in the reservation queue irrespective of the first voice call's place in the drop-in queue; and
connect the second voice call with an agent of the plurality of agents, the second voice call connected with the agent irrespective of the first voice call's place in the drop-in queue.

28. A method for reducing the wait time of a caller in an automatic call distribution system, comprising:
receiving a voice call from a phone of a caller;
receiving an indication from the phone of the caller that the caller desires to speak with one of a plurality of agents;
placing the received voice call in a drop-in queue, the voice call's place in the drop-in queue changing over time;
while the caller is waiting to speak with one of the plurality of agents when the voice call is in the drop-in queue:
  informing the caller, via the phone of the caller, of a delay before the caller can speak to one of the plurality of agents;
  offering the caller, via the phone of the caller, an opportunity to establish a reservation to call back at a particular time;
  wherein the reservation is independent of the voice call's place in the drop-in queue;
  receiving an indication from the phone of the caller that the caller would like to accept the reservation, wherein upon receiving the indication from the phone of the caller that the caller would like to accept the reservation, the voice call's place in the drop-in queue is no longer maintained;
providing a reservation code to the caller, via the phone of the caller, the reservation code configured to identify the caller upon the caller calling back and to place the caller in a reservation queue if the plurality of agents are busy when the caller calls back irrespective of the voice call's place in the drop-in queue; and
informing the caller, via the phone of the caller, to call back at the particular time.

29. A method for reducing the wait time of a caller in an automatic call distribution system, comprising:
receiving a first voice call from a first phone of a caller;
receiving an indication from the first phone of the caller that the caller desires to speak with one of a plurality of agents;

during the first voice call while the caller is waiting to speak with one of the plurality of agents:
  inquiring of the caller, via the first phone of the caller, if the caller has a previously arranged reservation;
  receiving an indication from the first phone of the caller that the caller does not have the previously arranged reservation;
  calculating an approximate wait time for a drop-in queue;
  informing the caller, via the first phone of the caller, of the approximate wait time for the drop-in queue;
  offering the caller, via the first phone of the caller, an opportunity to establish a reservation to call back during a reservation time frame;
  receiving an indication from the first phone of the caller that the caller would like to accept the reservation;
  requesting the caller to choose, via the first phone of the caller, the reservation time frame from a listing of available reservation time frames in the future, the listing provided to the caller at one time as a group;
  after providing at the one time the listing of available reservation time frames, receiving from the first phone of the caller the reservation time frame, the selected reservation time frame being one of the plurality of alternative reservation time frames provided as a group at the one time;
  determining a reservation code;
  providing the reservation code to the caller, via the first phone of the caller; and
  informing the caller, via the first phone of the caller, to call back during the reservation time frame;
receiving a second voice call from a second phone of the caller;
inquiring of the caller, via the second phone of the caller, if the caller has the reservation;
receiving an indication from the second phone of the caller that the caller does have the reservation;
requesting the reservation code from the caller, via the second phone of the caller;
receiving the reservation code from the second phone of the caller;
confirming validity of the reservation code comprising:
  confirming the reservation code exists; and
  confirming that the caller called during the reservation time frame associated with the reservation code;
transferring the second voice call to a reservation queue, the second voice call placed in the reservation queue irrespective of a timing of the first voice call; and
transferring the second voice call to one of the plurality of agents.

30. A method for reducing the wait time of a caller in an automatic call distribution system, comprising:
  receiving a voice call from a phone of a caller;
  receiving an indication from the phone of the caller that the caller desires to speak with one of a plurality of agents;
  during the voice call while the caller is waiting to speak with one of the plurality of agents:
  informing the caller, via the phone of the caller, of a delay before the caller can speak to one of the plurality of agents;
  providing the caller with an option, via the phone of the caller, to schedule a reservation to call back;
  receiving an indication from the phone of the caller that the caller would like to schedule the reservation to call back;
  informing the caller, via the phone of the caller, to call back during a reservation time frame;
  wherein the reservation time frame is negotiated between the caller and an automatic call distribution system; and
  wherein the negotiation between the caller and the automatic call distribution system comprises:
    receiving from the phone of the caller a requested time and date at which the caller desires to call back; and
    providing to the caller, via the phone of the caller, a time and date comprising a next available reservation time frame after the requested time and date; and
  upon receiving a second voice call from the caller based on the reservation time frame, placing the second received voice call in a reservation queue comprising other callers with reservations, the reservation queue free of callers without a reservation, the second voice call placed in the reservation queue irrespective of a timing of the first voice call.

31. A method for reducing the wait time of a caller in an automatic call distribution system, comprising:
  receiving a call from a caller, the call comprising a request for connection with one of a plurality of agents;
  informing the caller of a delay before the caller can speak to one of the plurality of agents;
  prompting the caller for a wait time that the caller is willing to wait in a queue of calls for connection with an agent;
  receiving from the caller a selected wait time that the caller is willing to wait for connection with an agent;
  disconnecting the caller;
  sensing that the queue of calls is at or below the selected wait time; and
  transmitting to the caller a message that the queue of calls is at or below the selected wait time.

32. The method of claim 31, wherein the message is an instant message.

33. The method of claim 31 wherein the message is an email message.

34. The method of claim 31, wherein the message is delivered telephonically.

* * * * *

UNITED STATES PATENT AND TRADEMARK OFFICE
CERTIFICATE OF CORRECTION

PATENT NO. : 8,175,257 B1
APPLICATION NO. : 09/872688
DATED : May 8, 2012
INVENTOR(S) : Shmuel Shaffer and Labhesh Patel It is certified that error appears in the above-identified patent and that said Letters Patent is hereby corrected as shown below:

In the Claims

Column 6, Line 17 after "cookie to an" please delete "interne" and insert -- internet --.

Signed and Sealed this
Eighth Day of October, 2013

Teresa Stanek Rea
*Deputy Director of the United States Patent and Trademark Office*